US010086357B2

(12) United States Patent
Bae et al.

(10) Patent No.: US 10,086,357 B2
(45) Date of Patent: Oct. 2, 2018

(54) METHOD FOR MANUFACTURING ACTIVATED CARBON

(71) Applicants: Hyundai Motor Company, Seoul (KR); Inha-Industry Partnership Institute, Incheon (KR)

(72) Inventors: Shin Tae Bae, Hwaseong-si (KR); Young Jung Heo, Danyang-eup (KR); Soo Jin Park, Seoul (KR)

(73) Assignees: Hyundai Motor Company, Seoul (KR); Inha-Industry Partnership Institute, Incheon (KR)

( * ) Notice: Subject to any disclaimer, the term of this patent is extended or adjusted under 35 U.S.C. 154(b) by 16 days.

(21) Appl. No.: 15/248,475

(22) Filed: Aug. 26, 2016

(65) Prior Publication Data
US 2017/0282152 A1    Oct. 5, 2017

(30) Foreign Application Priority Data
Apr. 5, 2016  (KR) .................. 10-2016-0041810

(51) Int. Cl.
| *C01B 31/08* | (2006.01) |
| *B01J 20/20* | (2006.01) |
| *C01B 32/354* | (2017.01) |
| *B01D 53/04* | (2006.01) |
| *B01J 20/30* | (2006.01) |
| *B60H 3/06* | (2006.01) |
| *C01B 31/12* | (2006.01) |

(52) U.S. Cl.
CPC .......... *B01J 20/20* (2013.01); *B01D 53/0407* (2013.01); *B01J 20/3021* (2013.01); *B01J 20/3064* (2013.01); *B01J 20/3078* (2013.01); *B60H 3/06* (2013.01); *C01B 31/12* (2013.01); *C01B 32/354* (2017.08); *B01D 2253/102* (2013.01); *B01D 2257/504* (2013.01)

(58) Field of Classification Search
CPC .............................. C01B 31/12; C01B 32/354
See application file for complete search history.

(56) References Cited

U.S. PATENT DOCUMENTS 9,040,452 B2 *    5/2015   Kishimoto .............. H01M 4/90
                                                                 423/231

FOREIGN PATENT DOCUMENTS

| JP | H09-500572 A    | 1/1997 |
| JP | 3110697 B2      | 11/2000 |
| KR | 10-1123586 B1   | 2/2012 |
| KR | 10-2014-0069432 A | 6/2014 |
| KR | 10-1588768 B1   | 1/2016 |
| WO | WO 95/01838 A1  | 1/1995 |

OTHER PUBLICATIONS

Zhang, X.L. et al., "Effect of activation agents on the surface of chemical properties and desuphurization performance of activated carbon," Science China, Sep. 2010, vol. 53, No. 9: 2515-2520.

* cited by examiner

*Primary Examiner* — Stuart Hendrickson
(74) *Attorney, Agent, or Firm* — Morgan, Lewis & Bockius LLP

(57) ABSTRACT

An activated carbon manufacturing method may include preparing activated carbon precursors, carbonizing the activated carbon precursors by performing a heat treatment on the activated carbon precursors, equalizing the activated carbon precursors which were carbonized, in the carbonizing, by grinding the activated carbon precursors, activating the activated carbon precursors by inserting an oxidizing agent and distilled water into the equalized activated carbon precursors, and performing a heat treatment on the activated carbon precursors, and introducing a nitrogen-based functional group into a surface of the activated carbon precursors by mixing the activated carbon precursors, a nitrogen material, and a solvent to perform reaction on the activated carbon precursors.

20 Claims, 3 Drawing Sheets

METHOD FOR MANUFACTURING ACTIVATED CARBON

CROSS-REFERENCE TO RELATED APPLICATION

The present application claims priority to Korean Patent Application No. 10-2016-0041810, filed Apr. 5, 2016, the entire contents of which is incorporated herein for all purposes by this reference.

BACKGROUND OF THE INVENTION

Field of the Invention

The present invention relates to an activated carbon manufacturing method.

Description of Related Art

Currently, interest in environmentally friendly cars is increasing rapidly due to problems such as fossil fuel depletion and the greenhouse gas exhaust causing the greenhouse effect. Especially in eco-friendly cars, a travel distance of the electric vehicle has emerged as an important issue.

For heating and cooling, unlike an internal combustion engine, the electric vehicle includes no waste heat source (engine coolant) for heating and no waste power for compressing a coolant. Accordingly, powers for a positive temperature coefficient (PTC) heater and for compressing the coolant are additionally required, and thus additional power is consumed. As a result, the travel distance is reduced by 30 to 50%.

Accordingly, it is necessary to minimize outdoor air introduction in order to preserve cold and warmth. In this case, the concentration of carbon dioxide in a vehicle is increased by carbon dioxide exhausted by passengers, and thus safety problems (2,000 ppm or more induces drowsiness, and 5,000 ppm causes a lapse into dyspnea) are generated.

As a result, studies to reduce the carbon dioxide included in the vehicle are ongoing. Currently, an air filter (including activated carbon) is applied to some high-end cars. However, this air filter can serve to remove harmful gasses such as volatile organic compounds (VOC), or fine dust, but it is difficult to remove carbon dioxide.

A conventional activated carbon manufacturing method is performed by carbonizing various vegetable materials such as coconut husks as precursors through a high temperature heat treatment under a non-activated environment, and by additionally performing a high temperature chemical or physical activation thereon to have a large number of pores. However, according to this conventional method, surface pore sizes of the manufactured activated carbon are diversified in a wide distribution range of micropores to macropores. As a result, pore uniformity is decreased. It is difficult to form ultra-micropores of one nm or less to have uniform distribution.

Accordingly, studies for improving an adsorptive capacity of carbon dioxide are being conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a manufacturing method of activated carbon, having advantages of being capable of improving selective adsorptive capacity of carbon dioxide by forming a large number of micropores and introducing a nitrogen-based functional group.

According to various aspects of the present invention, an activated carbon manufacturing method may include preparing activated carbon precursors, carbonizing the activated carbon precursors by performing a heat treatment on the activated carbon precursors, equalizing the activated carbon precursors which were carbonized, in the carbonizing, by grinding the activated carbon precursors, activating the activated carbon precursors by inserting an oxidizing agent and distilled water into the equalized activated carbon precursors, and performing a heat treatment on the activated carbon precursors, and introducing a nitrogen-based functional group into a surface of the activated carbon precursors by mixing the activated carbon precursors, a nitrogen material, and a solvent to perform reaction on the activated carbon precursors.

The oxidizing agent may be selected from the group including $H_2O_2$, $HNO_3$, $O_3$, $N_2O$, $H_2SO_4$, $F_2$, $Cl_2$, and a combination thereof, in the activating.

A volume of the oxidizing agent may be in a range of 10% volume to 50% volume of a total of 100% volume of the oxidizing agent and the distilled water, in the activating.

The activating may be performed at a temperature in a range of 700° C. to 1000° C.

The activating may be performed while injecting a mixture of the oxidizing agent and the distilled water into the activated carbon precursors at a speed in a range of 1 ml/hr to 100 ml/hr.

The activating may be performed under a pressure in a range of 0 bar to 5 bar.

The activating may be performed for a time period in a range of 1 hr to 5 hrs.

In the introducing the nitrogen-based functional group, the nitrogen material may be selected from the group including an amine-based compound, polypyrrole, poly(vinylidene fluoride), poly(vinylidene fluoride-co-hexafluoropropylene), poly(vinylidene chloride-co-acrylonitrile), poly(vinylidene chloride-co-acrylonitrile-co-methyl methacrylate), poly(vinylidene chloride-co-vinyl chloride), poly(vinylidene chloride-co-methyl acrylate), and a combination thereof.

The introducing of the nitrogen-based functional group may be performed at a temperature in a range of 60° C. to 120° C.

In the introducing of the nitrogen-based functional group, a mixing ratio of the nitrogen material may be in a range of 0.1% weight to 20% weight of a mixing ratio of 100% weight of the activated carbon precursors.

In the introducing of the nitrogen-based functional group, the solvent may include a hydroxyl group (—OH).

The solvent may be selected from the group including ethanol, ethyleneglycol, diethyleneglycol, polyethyleneglycol, 1,2-propanediol, dodacanediol, and a combination thereof.

An acid may be further mixed in the introducing of the nitrogen-based functional group into the activated carbon precursor surface by mixing the activated precursors, the nitrogen material, and the solvent to perform the reaction thereon.

The acid may be selected form the group including hydrochloric acid, sulfuric acid, and a mixture thereof.

The activated carbon manufacturing method may further include selecting the equalized activated carbon precursors by using a sieve having a size in a range of 100 μm to 250 μm, after the equalizing.

The equalizing may be performed using a ball mill, and a particle size of a ball used for the ball mill may be in a range of 1 mm to 20 mm.

A volume of the activated carbon precursor may be in a range of 0.1% volume to 40% volume of a total of 100% volume of the activated carbon precursor and the ball mill, in the equalizing.

A processing speed for the ball mill may be in a range of 100 rpm to 500 rpm, in the equalizing.

A processing time period for the ball mill may be in a range of 30 min to 5 hrs, in the equalizing.

The carbonizing may be performed at a temperature that is in a range of 700° C. to 1000° C.

In the preparing of the activated carbon precursor, the activated carbon precursors may be selected from the group including starch, coconut husks, citrus peel, coffee grounds, bamboo stems, and a combination thereof. According to various embodiments of the present invention, it is possible to provide a manufacturing method of activated carbon capable of improving selective adsorptive capacity of carbon dioxide by forming a large number of micropores and introducing a nitrogen-based functional group.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the various embodiments of the present invention, the word "ultra-micropore" indicates a pore having a diameter of 1 nm or less. Further, the word "micropore" indicates a pore having a diameter of 2 nm or less. In addition, the word "mesopore" indicates a pore having a diameter that is in a range of more than 2 nm but less than or equal to 50 nm.

As described above, surface pore sizes of the conventional activated carbon are diversified in a wide distribution range of micropores to macropores. As a result, pore uniformity is decreased. Ultra-micropores of 1 nm or less are formed, which causes difficulties.

Accordingly, various embodiments of the present invention are directed to providing a manufacturing method of activated carbon, capable of improving selective adsorptive capacity of carbon dioxide by forming a large number of ultra-micropores and introducing a basic active site into an activated carbon surface.

Figure 1:
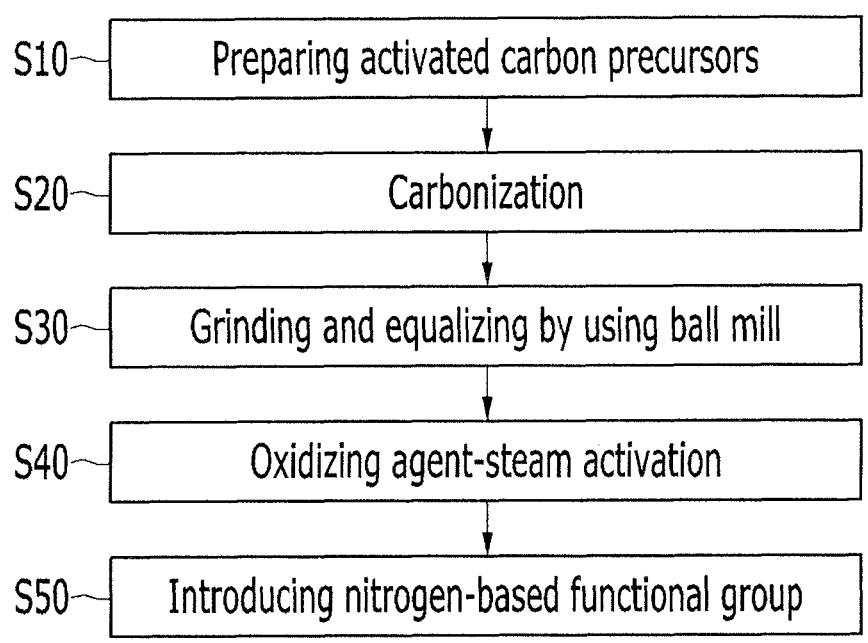
FIG. 1 is a schematic diagram illustrating an activated carbon manufacturing method according to various embodiments of the present invention.

FIG. 1 is a schematic diagram illustrating an activated carbon manufacturing method according to various embodiments of the present invention. Hereinafter, an activated carbon manufacturing method will be described with reference to FIG. 1.

According to various embodiments of the present invention, the activated carbon manufacturing method includes preparing activated carbon precursors (S10), carbonizing the activated carbon precursors by using a heat treatment (S20), equalizing the activated carbon precursors carbonized in the carbonizing by grinding them (S30), activating the activated carbon precursors by inserting an oxidizing agent and distilled water into the equalized activated carbon precursors and performing a heat treatment thereon (S40), and introducing a nitrogen-based functional group into the activated carbon precursor surface by mixing the activated precursors, a nitrogen material, and a solvent to perform reaction thereon (S50).

The grinding of the activated carbon precursors may be performed by using a ball mill. The grinding of the activated carbon precursors by using the ball mill facilitates equalizing size of particles thereof, thereby manufacturing high-quality activated carbon from which impurities are removed. However, the present invention is not limited thereto, as such a grinding operation may be performed by using any method that can execute uniform grinding, such as a milling method in addition to the method using the ball mill.

Further, the activated carbon precursors are activated by simultaneously using the oxidizing agent and the distilled water (oxidizing agent-steam activation) to increase the activity of steam molecules. Accordingly, it is possible to selectively increase a formation rate of ultra-micropores having a diameter of 1 nm or less on carbon surfaces. Thus, a specific surface area of the activated carbon and pore uniformity may be increased.

Hereinafter, each step of the manufacturing method and the manufactured activated carbon will be described.

In the preparing of the activated carbon precursors (S10), the activated carbon precursors may include starch, coconut husks, citrus peels, coffee grounds, bamboo stems, or a combination of any of the aforementioned. However, the present invention is not limited thereto, and any materials based on various vegetable matters can be employed as the activated carbon precursors. Such materials based on the inexpensive vegetable matters can reduce the manufacturing cost of the activated carbon.

The carbonizing of the activated carbon precursors by using a heat treatment (S20) may be performed in an inert gas atmosphere. The inert gas may include nitrogen or argon, but the present invention is not limited thereto.

A temperature of the heat treatment for the carbonizing may be in a range of 700° C. to 1000° C. The carbonizing may not be completed if it is performed at a temperature that is lower than 700° C. Since the carbonization is sufficiently performed in a temperature range of 700° C. to 1000° C., it is not necessary to perform the heat treatment at a temperature that exceeds 1000° C. In the case of the temperature that exceeds 1000° C., unnecessary costs may be generated, and the carbonization yield may be reduced.

The equalizing of the activated carbon precursors carbonized in the carbonizing by grinding them (S30) may be performed by using the ball mill, and materials of a ball used for the ball mill and a vessel of the ball mill may include stainless steel (SUS) or zirconia ($ZrO_2$), but the present invention is not limited thereto.

A particle size of the ball used for the ball mill may be in a range of 1 mm to 20 mm. In the case that the size of the ball is too small, the yield may be rapidly reduced, and a relative content of impurities in particles may be increased. In contrast, in the case that the size of the ball is too large, particles having large sizes may be mainly formed, thereby reducing a ball mill effect.

A volume of the activated carbon precursors may be in a range of 0.1% volume to 40% volume of a total volume 100% volume of the ball used for the activated carbon precursors and the ball mill. In more detail, the volume of the activated carbon precursors may be in a range of 0.1% volume to 30% volume. In the case that the volume of the precursor is too large for the volume of the ball, the ball mill effect may be deteriorated. In contrast, in the case that the volume of the precursors is too small, heat generated in the ball mill may be increased, thereby reducing the yield.

A processing speed of the ball mill may be in a range of 100 rpm to 500 rpm. In the case that the processing speed of the ball mill is too quick, a reaction vessel may be excessively heated. In contrast, in the case that the processing speed of the ball mill is too slow, the ball mill effect may be reduced, thereby causing problems.

A processing time of the ball mill may be in a range of 30 min to 5 hrs. In the case that the processing time of the ball mill is too long, a general yield may be reduced, and a general particle size may be reduced. In contrast, in the case that the processing time of the ball mill is too short, the ball mill effect may be reduced, thereby causing problems.

The activated carbon manufacturing method may further include cleaning the precursor by using an acid in order to remove impurities, after the equalizing through the ball mill process. Herein, the acid used may include hydrochloric acid, nitric acid, or sulfuric acid, but the present invention is not limited thereto.

In addition, the activated carbon manufacturing method may further include selecting the equalized activated carbon precursors by using a sieve having a size that is in a range of 100 μm to 250 μm, after the equalizing and the acid cleaning. As such, it is possible to manufacture activated carbon capable of equalizing particle sizes, increasing a specific surface area, and removing impurities. The particle size uniformity of the activated carbon is an important factor when the activated carbon is manufactured to apply it to an actual product. For example, when being used for a water purifier filter, a vehicle air conditioner filter, a supercapacitor electrode, or the like, the activated carbon is modified into a pellet or granular shape by mixing it with a binder. In this case, if the particle sizes are not uniform, the performance may be deteriorated. As described above, in the case that the precursors are selected by using the sieve having a size that is in a range of 100 um to 250 um, it is possible to use them in a vehicle air conditioner filter.

The oxidizing agent employed in the activating of the activated carbon precursors by inserting an oxidizing agent and distilled water into the equalized activated carbon precursors and performing a heat treatment thereon (S40) may include $H_2O_2$, $HNO_3$, $O_3$, $N_2O$, $H_2SO_4$, $F_2$, $Cl_2$, another halogen-group oxidizing agent, or a combination thereof. $H_2O_2$ may be preferred, but the present invention is not limited thereto. As described above, the activated carbon precursors are activated by simultaneously using the oxidizing agent and the distilled water (oxidizing agent-steam activation) to increase the activity of steam molecules. Accordingly, it is possible to selectively increase a formation rate of ultra-micropores having a diameter of 1 nm or less on carbon surfaces. Therefore, a specific surface area of the activated carbon and pore uniformity may be increased.

Specifically, the activated carbon is conventionally formed to have 50% to 70% of micropores with a diameter 2 nm and a large amount (30% to 50%) of mesopores with a diameter of 2 to 50 nm. Accordingly, it is difficult to form ultra-micropores of 1 nm or less. However, as described above, it is possible to form a large number of ultra-micropores of 1 nm or less through the oxidizing agent-steam activation.

More specifically, as supported in the following examples, ultra-micropores having a diameter of 1.0 nm or less may be formed on a surface of the activated carbon through such activation. For example, sizes of the activated carbon may be in a range of greater than 0 up to 1.0 nm, greater than 0.3 nm up to 1.0 nm, greater than 0.3 nm up to 0.6 nm, 0.6 nm or less, greater than 0 nm up to 0.6 nm, 0.75 nm or less, greater than 0.3 nm up to 0.75 nm, or greater than 0 nm up to 0.75 nm. In this case, a total pore volume of the activated carbon surface may be in a range of 0.5 $cm^3$/g to 0.7 $cm^3$/g, and a pore volume of the ultra-micropores thereof may be in a range of 0.4 $cm^3$/g to 0.5 $cm^3$/g. Further, a volume of the ultra-micropore may be in a range of 67% volume to 83% volume of a total of 100% volume of pores of the activated carbon surface. The specific surface area can be greatly improved by using a high pore volume ratio of the ultra-micropores having a high pore volume ratio. Specifically, a specific surface area of Brunauer-Emmett-Teller (BET) of the activated carbon may exceed 672.7 $m^2$/g. More specifically, the specific surface area may be in a range of greater than 672.7 $m^2$/g to 1185.1 $m^2$/g.

In the activating, a volume of the oxidizing agent may be in a range of 10% volume to 50% volume of a total of 100% volume of the oxidizing agent and distilled water. For example, the volume of the oxidizing agent may be in a range of 5% volume to 50% volume, 5% volume to 40% volume, 5% volume to 35% volume, 5% volume to 25% volume, or 5% volume to 15% volume. As a ratio of the oxidizing agent is increased, a specific surface area is increased by an introducing ratio of an oxygen functional group into precursor surfaces and micropore development. However, if the ratio of the oxidizing agent is too high, a ratio of the micropores may be reduced, thereby reducing the specific surface area and the yield.

The activating may be performed at a temperature that is in a range of 700° C. to 1000° C. If the activating is performed at a temperature that is lower than 700° C., an activating effect may be reduced. If the activating is performed at a temperature that is higher than 1000° C., the yield may be sharply deteriorated.

The activating may be performed while injecting a mixture of an oxidizing agent and distilled water into a furnace, after the activated carbon precursors are inserted into the furnace. In this case, the mixture of the oxidizing agent and the distilled water may be inserted into the furnace into which the activated carbon precursors have been inserted at a speed that is in a range of 1 ml/hr to 100 ml/hr, and an internal pressure of the furnace may be adjusted in a range of greater than 0 bar up to 5 bar. The internal pressure of the furnace may be adjusted in a range of 2 bar to 5 bar. If the internal pressure of the furnace is too low, the activating effect may be reduced. In contrast, if the internal pressure of the furnace is too high, breakage of micropores and development of pores that are larger than the mesopores may be significantly increased, thereby reducing the specific surface area. In addition, as the pressure is increased, a carbonization yield may be reduced.

The activating may be performed for a time that is in a range of 1 h to 5 hrs. If an activating time is too long, the yield may be reduced, and a general structure of the pores of the material may be broken. In contrast, if the activating time is too short, an activating effect may be reduced.

According to various embodiments of the present invention, the manufacturing method of the activated carbon may further include reducing surfaces of the activated carbon precursors by performing a heat treatment thereon under an atmosphere including hydrogen ($H_2$), after the activating. In the aforementioned oxidizing agent-steam activation, the carbon dioxide adsorptive capacity may be reduced by introduction of an acidic site δ+ caused by the oxidizing agent. However, in the case of using an additional reducing step of a surface functional group, the basicity may be increased by introducing a nitrogen-based functional group that is beneficial to carbon dioxide adsorption into a surface thereof, thereby improving a carbon dioxide adsorptive capacity.

In the introducing of the nitrogen-based functional group, the nitrogen material may be an organic compound including a nitrogen-based functional group. Specifically, it may include an amine compound. As the organic compound including the nitrogen-based functional group is used, a nitrogen-based functional group may be introduced into an activated carbon surface, and the nitrogen-based functional group may serve as a carbon dioxide-philic adsorption site for inducing adsorption of carbon dioxide gas to improve a carbon dioxide-selecting adsorptive capacity of the activated carbon. Non-limited examples of the amine compound may include monoethanolamine (MEA), diethanolamine (DEA), triethanolamine, and polyethylenediamine. Preferably, polyethylenediamine may be employed. However, the present invention is not limited thereto, but any material capable of introducing the organic-based functional group may be employed. An example of the amine compound may include polypyrrole, poly(vinylidene fluoride), poly(vinylidene fluoride-co-hexafluoropropylene, poly(vinylidene chloride-co-acrylonitrile), poly(vinylidene chloride-co-acrylonitrile-co-methyl methacrylate), poly(vinylidene chloride-co-vinyl chloride), poly(vinylidene chloride-co-methyl acrylate), or a combination thereof.

The introducing of the nitrogen-based functional group may be performed at a temperature that is in a range of 60° C. to 120° C. An introducing effect of the nitrogen-based functional group may be maximized in this range. In more detail, the introducing of the nitrogen-based functional group may be performed at a temperature that is in a range of 80° C. to 100° C.

In the introducing of the nitrogen-based functional group, a mixing ratio of the nitrogen material may be in a range of 0.1% weight to 200% weight for a mixing ratio 100% weight of the activated carbon precursors. As an amount of the nitrogen material is increased, the carbon dioxide adsorption site is increased. In contrast, formation of micropores may be deteriorated. Accordingly, the content of the nitrogen material may be preferably in the range. In more detail, the content of the nitrogen material may be preferably in a range of 0.1% weight to 150% weight, 0.1% weight to 100% weight, 20% weight to 2000% weight, 20% weight to 150% weight, or 50% weight to 150% weight.

In the introducing of the nitrogen-based functional group, a compound containing a hydroxyl group (—OH) may be employed as the solvent. For example, an ethanol solvent or a polyol solvent may be employed. However, the present invention is not limited thereto. In more detail, a solvent of pH 7 or more containing a hydroxyl group (—OH). Accordingly, it is possible to easily control dispersibility between solutes by improving a size of metal particles. Non-limited examples of the solvent of pH 7 or more containing the hydroxyl group (—OH) may include ethanol, ethyleneglycol, diethyleneglycol, polyethyleneglycol, 1,2-propanediol, dodacanediol, and a mixture of two or more kinds thereof.

Further, an acid may be additionally mixed into the solvent. Examples of the acid may include hydrochloric acid, sulfuric acid, or a combination thereof. The acid serves to introduce an acidic active site for introducing the nitrogen-based functional group.

The following examples illustrate the present invention in more detail.

EXAMPLES

Comparative Example 1

A sample was obtained by inserting vegetable-based activated carbon precursors (starch) into a tubal furnace, heating them to 800° C. at a temperature-increasing speed of 2° C./min, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hr.

The carbonized activated carbon precursors were then ground, sequentially cleaned by using a 1 M hydrochloric acid solution, and dried in a vacuum oven, to obtain activated carbon. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was set to 30% volume of a total of 100% volume of the balls used for the activated carbon precursors and ball mill.

Comparative Example 2

A sample was obtained by inserting vegetable-based activated carbon precursors (starch) into a tubal furnace, heating them to 800° C. at a temperature-increasing speed of 2° C./min, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hrs.

The carbonized activated carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was to set as 30% volume for a total of 100% volume of the balls used for the activated carbon precursors and ball mill.

Thereafter, carbonized starch was uniformly spread in an alumina boat and positioned in a tubal furnace.

Next, after the sample was heated to 800° C. at a temperature-increasing speed of 2° C./min under a nitrogen ($N_2$) atmosphere, the supply of nitrogen ($N_2$) gas was stopped, and distilled water was injected at a speed of 6 ml/hr to be activated while maintaining an internal pressure of the furnace for 1 hr.

Thereafter, the sample was cleaned one or two times by using a 1 M hydrochloric acid solution and distilled water, and then was completely dried at 120° C. for 12 hrs, to obtain activated carbon.

Example 1

A sample was obtained by inserting vegetable-based activated carbon precursors (starch) inserted into a tubal furnace, heating them to 800° C. at a temperature-increasing speed of 2° C./min under a nitrogen ($N_2$) gas atmosphere, and maintaining them for 90 min to carbonize them. Then, it was cooled to room temperature. Thereafter, the sample was cleaned one or two times by using a 1 M hydrochloric acid solution and distilled water, and then was completely dried at 120° C. for 12 hrs.

The carbonized activated carbon precursors were then ground, sequentially cleaned by using a 1 M hydrochloric acid solution, and dried in a vacuum oven. In the ball mill grinding, zirconia balls having diameters of 5 mm and 10 mm were mixed (5 mm:10 mm=30% volume:70% volume) to be used, and the grinding was performed at 360 rpm for 1 hr. Further, a volume of the activated carbon precursors was to set as 30% volume for a total of 100% volume of the balls used for the activated carbon precursors and ball mill.

Then, the ground precursors were selected by using a 150 um sieve. Thereafter, carbonized starch was uniformly spread in an alumina boat and positioned in a tubal furnace.

Next, after the sample was heated to 800° C. at a temperature-increasing speed of 2° C./min under a nitrogen ($N_2$) atmosphere, the supply of nitrogen $N_2$ gas was stopped, and a material obtained by mixing hydrogen peroxide (oxidizing agent) and distilled water at a volume ratio (10:90, oxidizing agent:distilled water) was injected at a speed of 6 ml/hr to be activated while maintaining an internal pressure of the furnace for 1 hr.

Thereafter, dried activated carbon was cleaned one or two times by using a 1 M hydrochloric acid solution and distilled water, and then was completely dried at 120° C. for 12 hrs, to obtain activated carbon.

10 g of the dried activated carbon was inserted into a nitric acid/sulfuric acid/ethanol mixing solution in which 1.5 g of polyethylenediamine was dissolved, and the solution was agitated at 120° C. for 6 hrs. Thereafter, it was cooled to room temperature, and was cleaned/dried by using ethanol 5 times.

EXPERIMENTAL EXAMPLE

Experimental Example 1

77K/nitrogen adsorption experiment was performed by using BELSORP MAX equipment made in Japan by BELSORP company. This result is shown in Table 1.

A deriving operation of data in Table 1 is as follows. A specific surface area is derived by using a Brunauer-Emmett-Teller (BET) formula. A total pore volume is calculated by using an adsorptive curve up to a relative pressure of 0.990, a micropore volume is derived by using a Dubinin-Radushkevich (D-R) formula, and a volume of mesopores is calculated by subtracting a volume of micropores from the total pore volume.

As shown in Table 1, formation of the micropores is further improved in the activated carbon of Example 1 performing oxidizing agent-steam activation using an oxidizing agent and distilled water than in Comparative Example 2 using distilled water.

TABLE 1

| Classification | BET specific surface area ($m^2g^{-1}$) | Total pore volume ($cm^3g^{-1}$) | Micropore volume ($cm^3g^{-1}$) | Mesopore volume ($cm^3g^{-1}$) | Micropore volume ratio (%) |
|---|---|---|---|---|---|
| Comparative Example 1 | — | — | — | — | — |
| Comparative Example 2 | 672.7 | 0.2763 | 0.2545 | 0.0218 | 92.0 |
| Example 1 | 869.3 | 0.3654 | 0.3435 | 0.0219 | 94.6 |

Experimental Example 2

Figure 2:
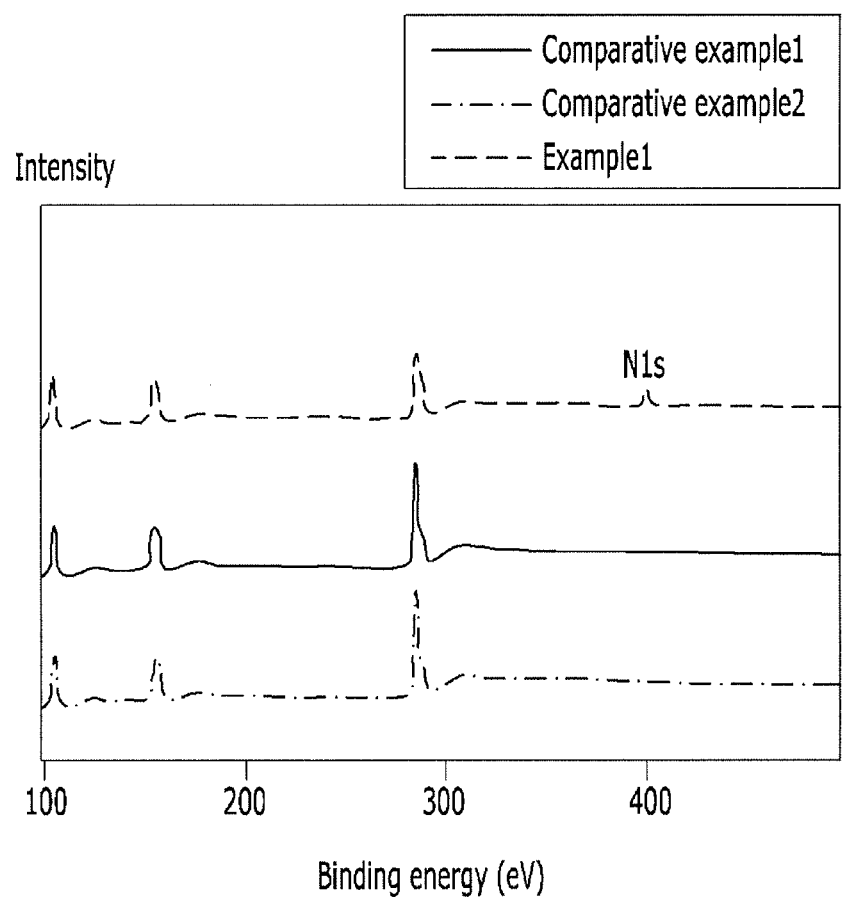
FIG. 2 illustrates data for checking that a nitrogen-based functional group is introduced into an activated carbon surface.

Surface functional groups of activated carbon were analyzed by employing XPS equipment made by Thermo Fisher Scientific company. This result is shown in FIG. 2. As shown in FIG. 2, it is seen from N peak formation which does not appear in Comparative Examples 1 and 2 that nitrogen functional groups of material surfaces are introduced through introduction of nitrogen functional groups.

Experimental Example 3

Figure 3:
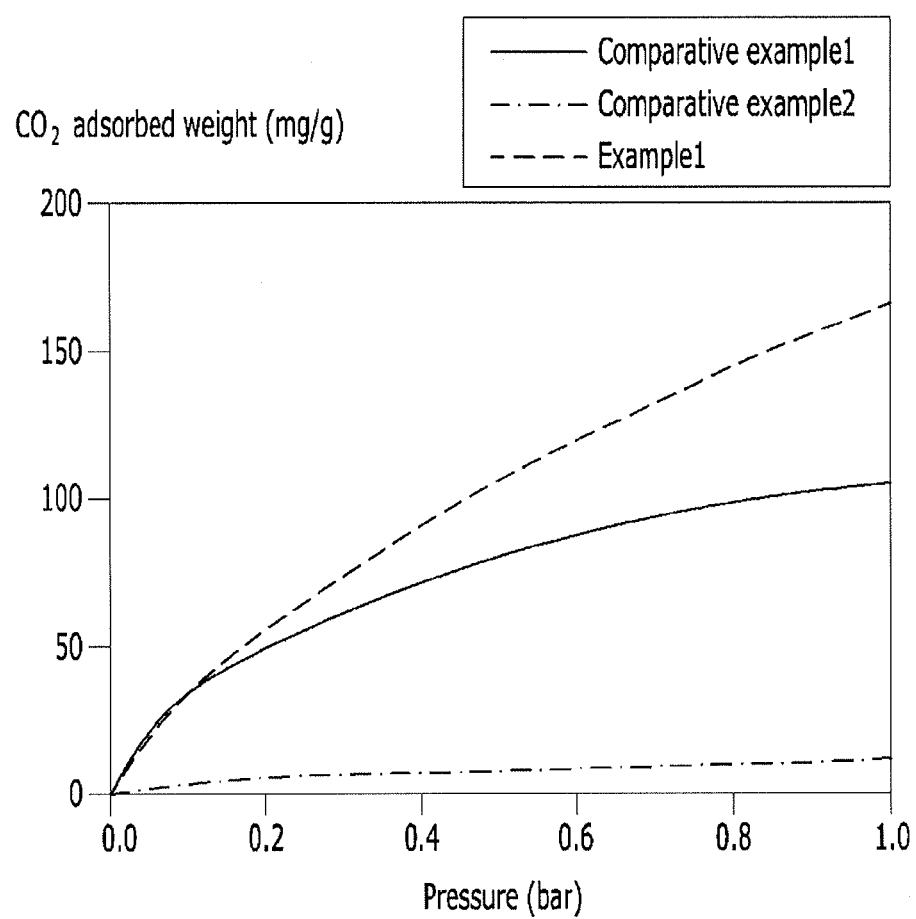
FIG. 3 illustrates data of measuring a carbon dioxide adsorptive capacity.

298K/carbon dioxide adsorbing experiment was performed by using BELSORP MAX equipment made in Japan by BELSORP company. This result is shown in FIG. 3. A solution obtained by mixing ethylene glycol and water at a ratio of 3:7 was inserted into a constant temperature oven to be maintained at 298 K, in order to maintain a room temperature state.

As shown in FIG. 3, in Comparative Example 1, a carbon dioxide adsorbing effect is hardly obtained. Further, it is seen that the carbon dioxide adsorbing effect of the activated carbon is improved in Example 1 using the oxidizing agent-steam activation and introducing nitrogen-based functional groups into the surfaces as compared with Comparative Example 2 using the steam activation.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An activated carbon manufacturing method comprising:
    preparing activated carbon precursors;
    carbonizing the activated carbon precursors by performing a heat treatment on the activated carbon precursors to obtain a carbonized material;
    equalizing the carbonized material, by grinding the carbonized material to obtain an equalized material;
    activating the equalized material by inserting an oxidizing agent and distilled water into the equalized material, and performing a heat treatment on the equalized material to obtain an activated material; and
    introducing a nitrogen-based functional group into a surface of the activated material by mixing the activated material, a nitrogen material, a solvent, and an acid to perform a reaction on the activated material.

2. The activated carbon manufacturing method of claim 1, wherein, in the activating the equalized material step, the oxidizing agent is selected from the group consisting of $H_2O_2$, $HNO_3$, $O_3$, $N_2O$, $H_2SO_4$, $F_2$, $Cl_2$, and a combination thereof.

3. The activated carbon manufacturing method of claim 1, wherein, in the activating the equalized material step, a volume of the oxidizing agent is in a range of 10% volume to 50% volume of a total of 100% volume of the oxidizing agent and the distilled water.

4. The activated carbon manufacturing method of claim 1, wherein the activating is performed at a temperature in a range of 700° C. to 1000° C.

5. The activated carbon manufacturing method of claim 1, wherein the activating is performed while injecting a mixture of the oxidizing agent and the distilled water into the equalized material at a speed in a range of 1 ml/hr to 100 ml/hr.

6. The activated carbon manufacturing method of claim 5, wherein the activating is performed under a pressure in a range of 0 bar to 5 bar.

7. The activated carbon manufacturing method of claim 1, wherein the activating is performed for a time period in a range of 1 hr to 5 hrs.

8. The activated carbon manufacturing method of claim 1, wherein, in the introducing the nitrogen-based functional group, the nitrogen material is selected from the group consisting of an amine-based compound, polypyrrole, poly(vinylidene fluoride), poly(vinylidene fluoride-co-hexafluoropropylene), poly(vinylidene chloride-co-acrylonitrile), poly(vinylidene chloride-co-acrylonitrile-co-methyl methacrylate), poly(vinylidene chloride-co-vinyl chloride), poly(vinylidene chloride-co-methyl acrylate), and a combination thereof.

9. The activated carbon manufacturing method of claim 1, wherein the introducing of the nitrogen-based functional group is performed at a temperature in a range of 60° C. to 120° C.

10. The activated carbon manufacturing method of claim 1, wherein, in the introducing of the nitrogen-based functional group step, a mixing ratio of the nitrogen material is in a range of 0.1% weight to 20% weight of a mixing ratio of 100% weight of the activated material.

11. The activated carbon manufacturing method of claim 1, wherein, in the introducing of the nitrogen-based functional group, the solvent comprises a hydroxyl group (—OH).

12. The activated carbon manufacturing method of claim 11, wherein the solvent is selected from the group consisting of ethanol, ethyleneglycol, diethyleneglycol, polyethyleneglycol, 1,2-propanediol, dodacanediol, and a combination thereof.

13. The activated carbon manufacturing method of claim 1, wherein the acid is selected from the group consisting of hydrochloric acid, sulfuric acid, and a mixture thereof.

14. The activated carbon manufacturing method of claim 1, further comprising selecting the equalized material by using a sieve having a size in a range of 100 μm to 250 μm, after the grinding of the equalized material.

15. The activated carbon manufacturing method of claim 1, wherein the equalizing is performed using a ball mill, and a particle size of a ball used for the ball mill is in a range of 1 mm to 20 mm.

16. The activated carbon manufacturing method of claim 15, wherein, in the equalizing the carbonized material step, a volume of the carbonized material is in a range of 0.1% volume to 40% volume of a total of 100% volume of the carbonized material and the ball mill, in the equalizing.

17. The activated carbon manufacturing method of claim 15, wherein, in the equalizing the carbonized material step, a processing speed for the ball mill is in a range of 100 rpm to 500 rpm.

18. The activated carbon manufacturing method of claim 15, wherein, in the equalizing the carbonized material step, a processing time period for the ball mill is in a range of 30 min to 5 hrs, in the equalizing.

19. The activated carbon manufacturing method of claim 1, wherein the carbonizing is performed at a temperature that is in a range of 700° C. to 1000° C.

20. The activated carbon manufacturing method of claim 1, wherein, in the preparing of the activated carbon precursor step, the activated carbon precursors are selected from the group consisting of starch, coconut husks, citrus peel, coffee grounds, bamboo stems, and a combination thereof.

* * * * *